United States Patent
Jarosh et al.

(10) Patent No.: US 8,578,134 B1
(45) Date of Patent: Nov. 5, 2013

(54) SYSTEM AND METHOD FOR ALIGNING CHANGE-OF-FLOW INSTRUCTIONS IN AN INSTRUCTION BUFFER

(75) Inventors: David Jarosh, Austin, TX (US); Daniel E. Yee, Loveland, CO (US)

(73) Assignee: GlobalFoundries Inc.

( * ) Notice: Subject to any disclaimer, the term of this patent is extended or adjusted under 35 U.S.C. 154(b) by 1906 days.

(21) Appl. No.: 11/098,273

(22) Filed: Apr. 4, 2005

(51) Int. Cl.
  *G06F 15/00* (2006.01)
  *G06F 9/30* (2006.01)
  *G06F 9/40* (2006.01)

(52) U.S. Cl.
  USPC .......................... 712/204; 712/237; 712/238

(58) Field of Classification Search
  USPC ......................... 712/214, 204, 237
  See application file for complete search history.

(56) References Cited

U.S. PATENT DOCUMENTS

| | | | | |
|---|---|---|---|---|
| 5,136,697 | A * | 8/1992 | Johnson | 712/239 |
| 6,260,138 | B1 * | 7/2001 | Harris | 712/239 |
| 6,895,496 | B1 * | 5/2005 | Taniguchi et al. | 712/207 |
| 2004/0236926 | A1 * | 11/2004 | Tran et al. | 712/204 |
| 2005/0198481 | A1 * | 9/2005 | Henry et al. | 712/238 |

OTHER PUBLICATIONS

John L. Hennessy and David A. Patterson, Computer Architecture: A Quantitative Approach, 2003, Morgan Kaufmann Publishers, Third Edition, pp. 209-213.*

* cited by examiner

*Primary Examiner* — Andrew Caldwell
*Assistant Examiner* — George Giroux (57) ABSTRACT

A method and processor are provided. The method includes storing a first value at a first field of a first cache tag line when a next occurrence of a first COF instruction is presumed to branch and when the end location of the first COF instruction is at a first location of memory, storing a second value at the first field to indicate the next occurrence of the first COF instruction is presumed to branch and when the end location of the first COF instruction is at a second location of memory. The processor includes an instruction cache having instruction data represented by a plurality of data segments and a prefetch unit. The prefetch unit is operable to receive a first data segment from the instruction cache and determine whether an end byte of a predicted taken COF instruction is present in the first data segment.

20 Claims, 5 Drawing Sheets

SYSTEM AND METHOD FOR ALIGNING CHANGE-OF-FLOW INSTRUCTIONS IN AN INSTRUCTION BUFFER

BACKGROUND

When executing a software program a processor typically fetches instructions from memory and then executes the instructions. The processor generally begins at a starting instruction and executes instructions sequentially from lower linear memory addresses to higher memory addresses until an instruction that indicates that the next instruction be executed is not the next sequential instruction. Such instructions are referred to herein as change-of-flow (COF) instructions. Examples of COF instructions may include, but are not limited to, jumps, conditional branches, calls, returns and interrupt instructions. When a COF instruction indicates that the next instruction to be executed is not the next sequential instruction, the COF instruction typically indicates, either explicitly or implicitly, the address of the next instruction to be executed. The address of the non-sequential instruction to be executed after a COF instruction is called the COF instruction's "target". In certain instances, a COF instructions target may be the next sequential instruction.

Conditional COF instructions, such as conditional branches, may be predicted as either "taken" or "not taken". If a COF instruction is predicted as "not taken" (i.e., presumed to not branch), then the instruction executed after the COF instruction is the instruction at the next sequential address. Conversely, if a COF instruction is predicted as "taken" (i.e., presumed to branch) then the instruction executed after the COF instruction is the "target" of the COF instruction. Unconditional COF instructions are always taken.

In the absence of COF instructions, the processor typically requests consecutive addresses from an instruction cache and sends the resulting instruction data from the instruction cache directly to an instruction pipeline. However, if one or more COF instructions are present, the processor typically attempts to predict the instruction to be executed following each COF instruction and then provide the instruction pipeline with the instruction data resulting from that prediction. Various mechanisms may be implemented to detect the existence of COF instructions that are predicted to be taken. Typically, the transfer of instruction data from an instruction cache to the processing pipeline may be delayed for any of a variety of reasons, such as delays caused by linear to physical address translation, memory fetches, and the like. Accordingly, many processor architectures utilize an instruction data buffer to buffer data received from the instruction cache prior to providing it to the processing pipeline for decoding and execution. However, in many processor architectures COF instructions may have variable lengths. This complicates alignment of COF instructions with the "target" instruction of the COF instruction in the instruction buffer. Data segments received from an instruction cache generally cannot be directly placed into the instruction buffer when a predicted taken COF is present within the data segment. Accordingly, conventional techniques have been developed to attempt to align data segments in the presence of COF instructions. To implement these conventional techniques, the starting address of the COF instruction is tracked and at least two instruction buffers typically are used with each buffer entry. When a predicted taken COF was detected, the instruction stream starting with the "target" of the COF instructions was stored in an instruction buffer separate from the buffer containing the COF instruction. Additional information is required to know when to switch from one buffer to another. These conventional techniques typically resulted in a delay (i.e., a "bubble") in the pipeline before the corresponding target instruction is fetched, thereby diminishing the performance of processors implementing these conventional techniques. Accordingly, a technique for improved COF instruction detection and alignment within an instruction buffer would be advantageous.

FIELD OF THE DISCLOSURE

The present disclosure is related generally to the preparation of instructions for execution by a processor and more particularly to detecting predicted taken COF instructions and aligning variable length instructions in an instruction buffer in the presence of COF instructions.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION OF THE DRAWINGS

FIGS. 1-7 illustrate exemplary techniques for aligning COF instructions in an instruction buffer prior to decoding. In at least one embodiment, a COF table having a plurality of COF tags corresponding to a plurality of COF instructions is utilized to indicate whether a data segment retrieved (or to be retrieved) from an instruction cache contains the last byte (i.e., the end byte) of a predicted taken COF instruction. If the end byte of a predicted taken COF instruction is not found within a data segment, at least a portion of the data segment may be loaded into the instruction buffer. However, if the end byte of a predicted taken COF instruction is found within a data segment, the portion of the data segment up to and including the last byte of the predicted taken COF instruction is loaded into the instruction buffer and the remaining data portion subsequent to the end byte is discarded. The target instruction of the predicted taken COF instruction is then loaded immediately following the end of the predicted taken COF instruction in the instruction buffer. In one embodiment the COF tags of the COF table include fields to indicate the location of the end byte of a predicted taken COF instruction, if any, within the data segment, and also may include field representative of the predictive strength, the type, and the like. Furthermore, each cache tag may utilize a field to indicate whether an alternate mode, such as using an alternate target address prediction algorithm, is to be implemented.

Figure 1:
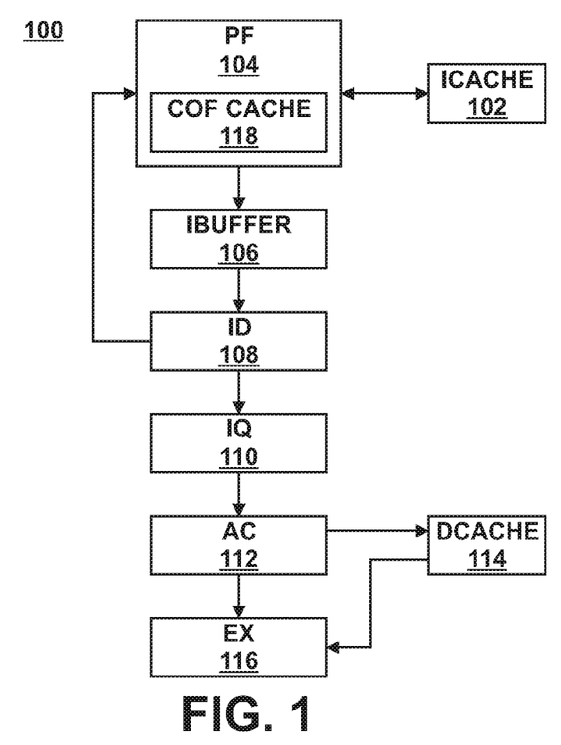
FIG. 1 is a block diagram illustrating an exemplary instruction pipeline of a processor in accordance with at least one embodiment of the present disclosure.

Referring now to FIG. 1, an exemplary instruction pipeline 100 of a processor is illustrated in accordance with at least one embodiment of the present disclosure. The illustrated instruction pipeline 100 includes an instruction cache 102, a prefetch unit 104, an instruction buffer 106, an instruction decode unit 108, an instruction queue 110, an address calculation unit 112 (including an operand fetch unit), a data cache 114, and an execution unit 116. In operation, the instruction cache 102 is loaded with instruction data obtained from, for example, system memory, wherein the instruction data is representative of at least a portion of a software routine to be processed and executed by the instruction pipeline 100. The prefetch unit 104, in one embodiment, obtains data segments, such as, for example, a quad word in accordance with the linear progression of addresses, and processes the data segments for storage in the instruction buffer 106. In one embodiment, the data segments represent at least a portion of a cache line.

It will be appreciated that the prefetch unit 104, in at least one embodiment, obtains data segments from the instruction cache 102 based on instruction addresses. The first byte referenced by the instruction address may refer to a byte of the obtained data segment other than the first byte of the obtained data segment. It will be appreciated that the bytes of the obtained data segment preceding the first byte referenced by the instruction address typically are not relevant. Accordingly, for ease of discussion, the portion of a data segment beginning at the first byte of the data segment referenced by an instruction address is referred to herein as the "applicable portion" of the data segment and the remaining bytes preceding the first byte referenced by the instruction address is referred to herein as the "inapplicable portion" of the data segment. Accordingly, when the address references the first byte of a data segment, the applicable portion of the data segment is the entire data segment.

The prefetch unit 104 stores at least part of the applicable portion of the obtained data segment in the instruction buffer 106 for subsequent decoding by the instruction decoder unit 108. Should the prefetch unit 104 determine that end byte of a predicted COF instruction received from the instruction cache 102 is located in an applicable portion of the obtained data segment, the prefetch unit 104 may write the applicable portion of the data segment up to and include, the end byte to the instruction buffer 106 while discarding or disregarding the portion of the data segment subsequent to the end byte. In one embodiment, the determination of whether the end of a predicted taken COF instruction is present within the applicable portion of a given data segment is based on the information stored in a COF cache 118, described in greater detail herein.

The instruction decode unit 108 obtains instruction data from the instruction buffer 106 and decodes the instruction data to generate decoded instructions, which then are stored in the instruction queue 110. In the event that the instruction decode unit 108 determines that the prefetch unit 104 has erred in its prediction of a COF instruction, the instruction decode unit 108 may signal this error to the prefetch unit 104 which then updates it COF cache 118 to reflect this new information. Typically, the instruction decode unit 108 detects an error in the prediction of a COF instruction by the prefetch unit 104 when the end of the predicted taken COF instruction indicated by the prefetch unit 104 is inconsistent with the resulting decoded COF instruction's end determined by the instruction decode unit 108 or when the prefetch unit 104 fails to predict the end of an unconditional branch.

The address calculation unit 112 obtains the decoded instructions from the instruction queue 110 and determines the addresses of one or more operands or operand data needed for the execution of the instruction. In the event that operand data is needed for the execution of the instruction, the address calculation unit 112 may signal or provide the associated addresses to a data cache 114. In the event that the necessary operands or operand data is cached in the data cache 114, the data cache 114 provides the data to the execution unit 116. If the data cache 114 does not have the operand data cached, a load operation from memory is performed.

The execution unit 116 receives the decoded instruction from the address calculation unit 112 and any operand data from the data cache 114 and executes the instruction using the operand data. The execution unit 116 then may provide information related to the execution of the decoded instruction to the prefetch unit 104. If the decoded instruction is a predicted taken COF instruction and the information indicates that the predicted taken COF instruction was resolved to actually be not taken, the prefetch unit 104 may update its COF cache 118 to reflect its misprediction. The instruction pipeline 100 further may be flushed of instruction data as a result of this misprediction of the COF instruction. Similarly, if the predicted taken COF instruction was correctly resolved, then the prefetch unit 104 may update its COF cache 118 as appropriate to reflect its accurate prediction of the COF instruction. The information provided by the execution unit 116 to the prefetch unit 104 may include, for example the linear address of the COF instructions target instruction that then may be inserted into the corresponding cache target in the COF cache 118.

Figure 2:
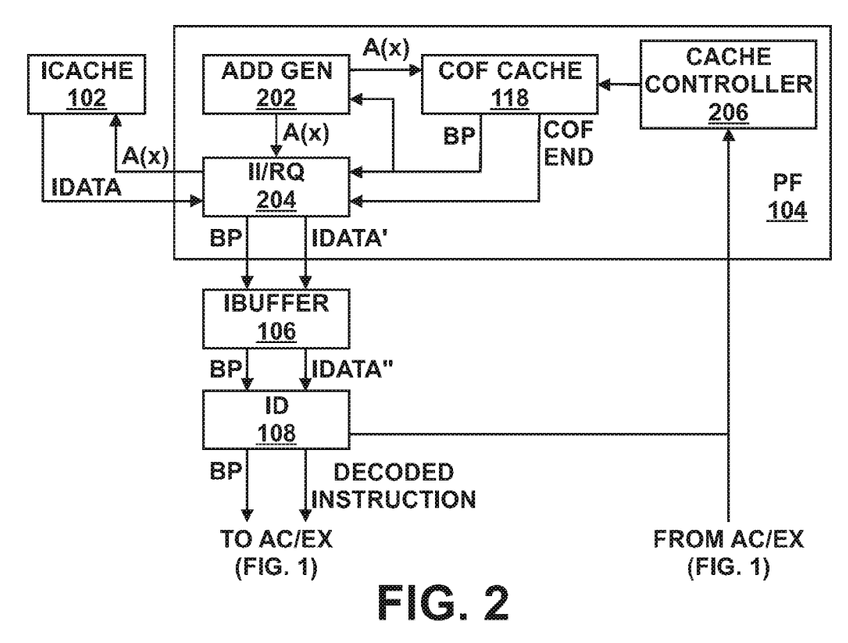
FIG. 2 is a block diagram illustrating an exemplary prefetch unit of the instruction pipeline of FIG. 1 in accordance with at least one embodiment of the present disclosure.

Referring now to FIG. 2 an exemplary implementation of the prefetch unit 104 is illustrated in accordance with at least one embodiment of the present disclosure. As depicted, the prefetch unit 104 may include an address generation unit 202, an instruction interface/request (II/RQ) module 204, and a cache controller 206. The address generation unit 202 provides a representation of the next address A(X) to the COF cache 118 and the instruction interface/request module 204. The instruction interface/request module 204, in turn, provides the address A(X) to the instruction cache 102. In at least one embodiment, the provision of the next address A(X) to the COF cache 118 may be decoupled from the provision of the next address A(X) to the instruction cache 102. Accordingly, the COF cache 118 may detect the presence of predicted taken COF instructions (as described herein) in data segments substantially separately from the obtaining of the data segments from the instruction cache 102, thereby reducing or eliminating the delay caused by the fetching of target instruction data from the instruction cache 102 following a predicted taken COF instruction.

The instruction cache 102 provides the instruction data associated with the address A(X) to the instruction interface/request module 204. In the event that the instruction cache 102 does not have the instruction data associated with the address A(X), a load operation from memory typically is performed to load the sought-after data into the instruction cache 102. Similarly if the COF cache 118 includes a cache tag having an address tag that matches at least a portion of the address A(X), the COF cache 118 provides the COF information associated with the COF tag to the instruction interface/request module 204, as well as any prediction information associated with a predicted taken COF instruction, if any, within the instruction data provided by the instruction cache 102.

Using the COF information provided by the COF cache 118, the instruction interface/request module 204 determines which portion of the data segment provided by the instruction cache 102 is to be provided for storage in the instruction buffer 106. In the event that the COF information provided by the COF cache 118 indicates that the end byte of a predicted taken COF instruction is not present within the applicable portion of the data segment, the instruction interface/request module 204 may write the applicable portion of the data segment to the instruction buffer 106. In contrast, if it is determined that the end byte of predicted taken COF instruction is present within the applicable portion of the data segment based on the COF information provided by the COF cache 118, the instruction interface/request module 204 may write a portion of the applicable portion of the data segment up to and including the end of the predicted taken COF instruction to the instruction buffer 106 while ignoring or discarding the remaining portion subsequent to the end byte. In this instance, the instruction interface/request module 204 further may provide the prediction information provided by the COF cache 118 to the instruction buffer 106 or directly to the instruction decode unit 108.

While decoding a predicted taken COF instruction from the instruction buffer 106, should the instruction decode unit 108 determine that the prefetch unit 104 erred in its prediction or in its characterization of the instruction as a predicted taken COF instruction, the instruction decode unit 108 may signal the cache controller 206 of this error. The cache controller 206 then may update the COF tag associated with the predicted taken COF instruction in the COF cache 118. Similarly, the execution unit 116 may provide a signal representative of this error to the cache controller 206 which then may update the COF cache 118 accordingly.

Figure 3:
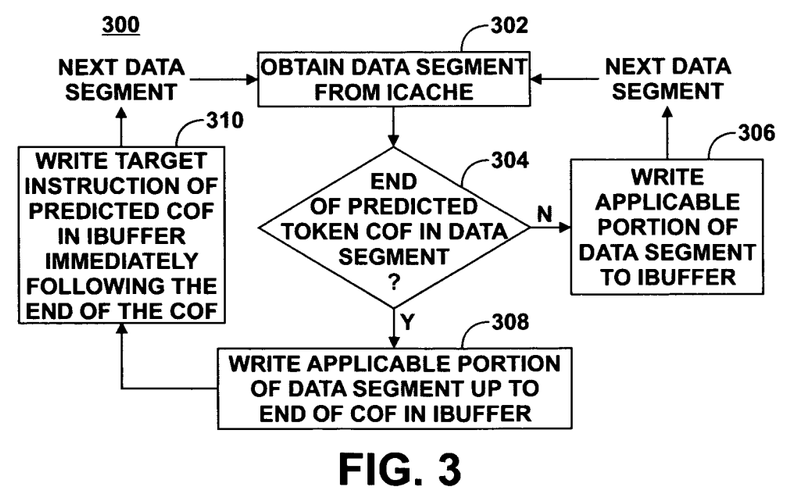
FIG. 3 is a flow diagram illustrating an exemplary method for aligning COF instructions in an instruction buffer in accordance with at least one embodiment of the present disclosure.
Figure 4:
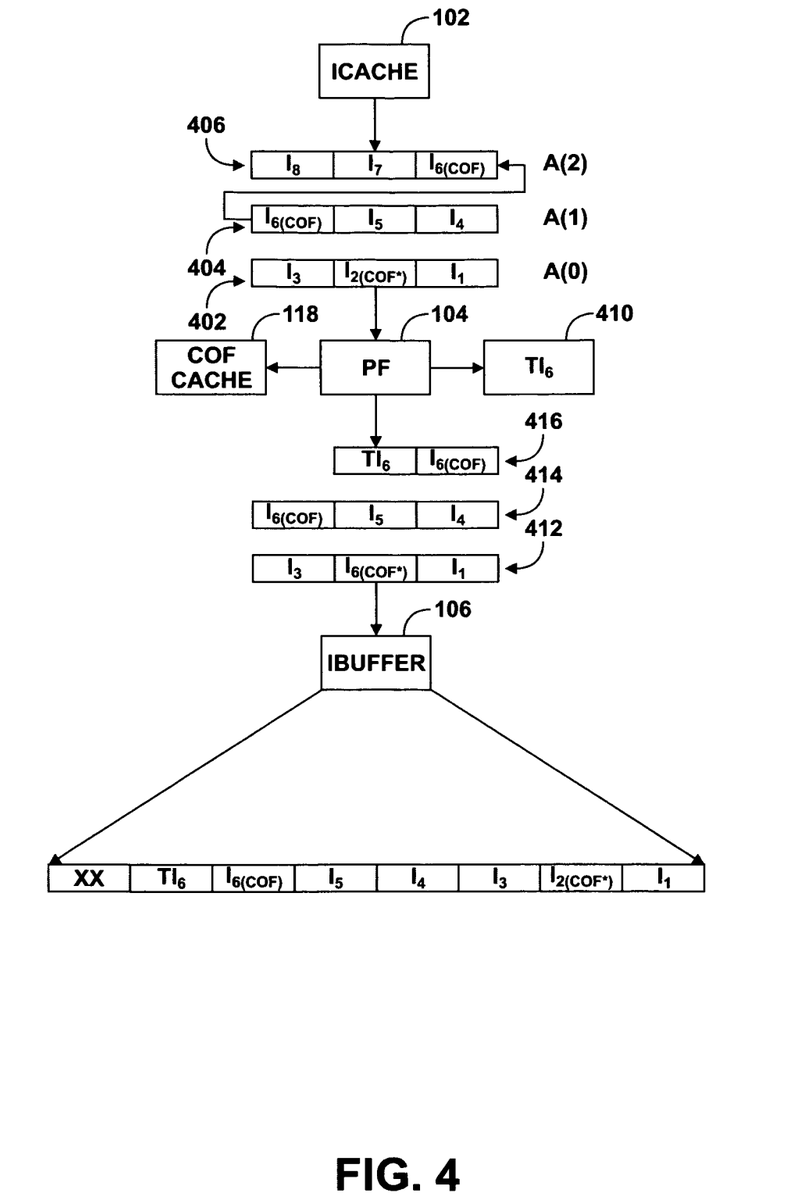
FIG. 4 is a flow diagram illustrating an exemplary implementation of the method of FIG. 3 using the instruction pipeline of FIG. 1 in accordance with at least one embodiment of the present disclosure.

Referring now to FIGS. 3 and 4, an exemplary method 300 illustrating an operation of the prefetch unit 104 and an exemplary demonstration of the operation is illustrated in accordance with at least one embodiment of the present disclosure. The method 300 initiates at step 302 wherein a data segment is obtained at the prefetch unit 104 from the instruction cache 102. At step 304, the prefetch unit 104 utilizes the COF cache 118 to determine whether the end byte of a predicted taken COF instruction is within the applicable portion of the data segment. If not present, the applicable portion of the data segment is written to the instruction buffer at step 306 and the next data segment from the instruction cache 102 is provided to the prefetch unit 104. In the event that the end byte of a predicted taken COF instruction is determined to be present in the applicable portion of the data segment, at step 308 a portion of the applicable portion of the data segment up to and including the end of the predicted taken COF instruction is written into the instruction buffer 102. At step 310 the target instruction of the predicted taken COF instruction is determined and the corresponding instruction data is written to the instruction buffer immediately following the end of the predicted taken COF instruction data in the instruction buffer 106.

Referring now to FIG. 4, an exemplary implementation of the method 300 is illustrated. In the depicted example, a series of data segments 402-406 are obtained from the instruction cache 104. The data segments 402-406 are associated with addresses A(0)-A(2), respectively. For ease of discussion, it is assumed that the instruction addresses align with the first byte of the data segments so that the applicable portions of the data segments are the entire data segments.

Upon receipt of the data segment 402, the prefetch unit 104 utilizes the data previously read from the COF cache 118 to determine whether the end byte of a predicted taken COF instruction resides within the applicable portion of the data segment 402. In the illustrated example the data segment 402 includes instructions $I_1$, $I_2$ and $I_3$, where instruction $I_2$ is a COF instruction predicted to be not taken. As the COF tag in the cache 118 associated with at least a portion of the address A(0) indicates that the end of a predicated taken COF instruction is not present in the applicable portion of the data segment 402, the prefetch unit 104 may output a representation 412 of the data segment 402 for storage in the instruction buffer 106. In at least one embodiment, the representation 412 is substantially equivalent to the applicable portion of the data segment 402. Upon receipt of the data segment 404, the prefetch unit 104 utilizes the COF cache 118 to determine whether the end of a predicted taken COF instruction is present within the applicable portion of the data segment 404. In the illustrated example, the data segment 404 includes instructions $I_4$, $I_5$ and a portion of instruction $I_6$, wherein the remaining of portion $I_6$ resides in the following data segment 406. In this example, the instruction $I_6$ is a predicted taken COF instruction, the end byte of this instruction is in the data segment 406 and therefore is not present in the data segment 404, and the COF cache 118 indicates that the known end byte of a predicted cache COF instruction is located within the applicable portion of the data segment 406. Accordingly, the prefetch unit 104 provides a representation 114 of the applicable portion of the data segment 404 for storage in the instruction buffer 106. In one embodiment the representation 414 is the substantial equivalent to the applicable portion of the data segment 404. Next, the prefetch unit 104 receives the data segment 406, which, in this example, includes the remaining portion of the instruction $I_6$, and the instruction $I_7$, and the instruction $I_8$. As indicated above, the instruction $I_6$ is a predicted taken COF instruction having its last byte within the data segment 406. Accordingly, the prefetch unit 104 identifies the end byte of the predicted taken COF $I_6$ instruction as residing in the applicable portion of the data segment 406 using the COF cache 118. Accordingly, the prefetch module 104 provides a representation 416 of only a portion of the data segment 406, wherein the representation 416 includes a portion of the applicable portion of the data segment 406 up to and including the end of the predicted taken COF instruction, in this case, the end byte of the instruction $I_6$. The remaining portion of the data segment 406, i.e., instructions $I_7$ and $I_8$, are discarded or ignored by the prefetch unit 104. As the instruction $I_6$ is identified as a predicted taken COF instruction, the prefetch unit 104 utilizes a target address array associated with or included in the COF cache 118 to identify the target address of the target instruction of the COF instruction represented by instruction $I_6$, and obtains the target instruction $TI_6$ 410 from the instruction cache or memory. The target instruction $TI_6$ 410 is written to the instruction buffer 106 immediately following the end of the data representing instruction $I_6$. The prefetch unit 104 then begins fetching instruction data based on the address immediately subsequent to the target instruction $TI_6$ 410 until another predicted taken COF instruction is encountered. As illustrated by FIG. 4, the result of the processing by the prefetch unit 104 on the data segments 402-406 is that the instruction buffer 106 stores instructions $I_1$, $I_2$, $I_3$, $I_4$, $I_5$, $I_6$ and $TI_6$. The instruction decode unit 108 (FIG. 1) therefore may sequentially access these instructions from the instruction buffer 106 and decode them for execution by the execution unit 116.

Figure 5:
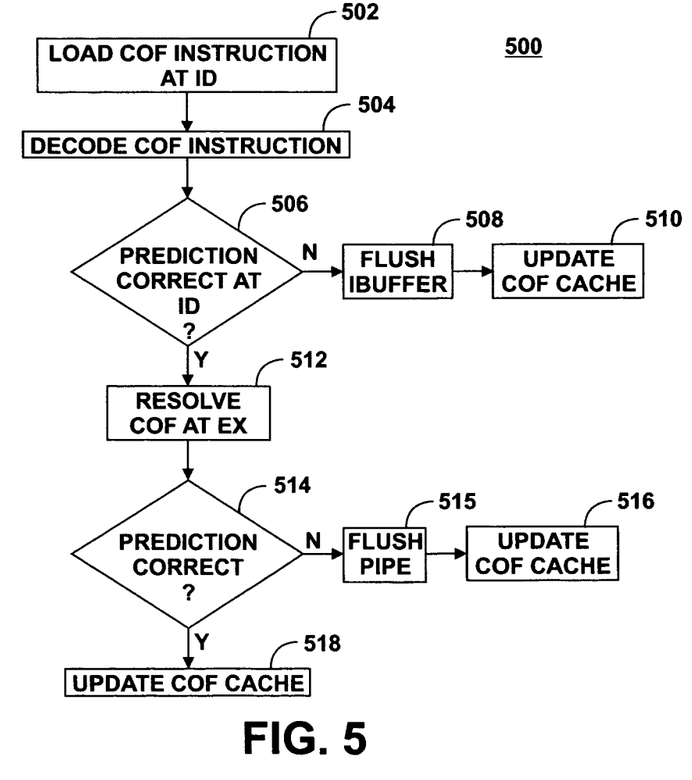
FIG. 5 is a flow diagram illustrating an exemplary method for updating a COF table having information related to the alignment of COF instructions in accordance with at least one embodiment of the present disclosure.

Referring now to FIG. 5, an exemplary method 500 for updating the COF cache 118 is illustrated in accordance with at least one embodiment of the present disclosure. As noted above, the COF cache 118 may be utilized by the prefetch unit 104 to determine whether the end of a predicted taken COF instruction is present within a data segment obtained from the instruction cache 102. However, in certain instances, the prefetch unit 104 may err in its characterization of the COF instruction as a COF instruction or in its prediction of whether the COF instruction is taken or not taken. Accordingly, method 500 provides for the creation and update of entries of the COF cache 118 corresponding to one or more COF instructions.

At step 502 a predicted taken COF instruction located in the instruction buffer 106 (FIG. 1) is obtained by the instruction decode unit 108. At step 504 the COF instruction is decoded by the instruction decode unit 108. At step 506 the instruction decode unit 108 determines whether the decoded COF instruction is consistent with the prefetch unit 104 characterization of the instruction of a predicted taken COF instruction. In one embodiment this determination is made based on a comparison of the resulting end byte of the decoded COF instruction and the expected end byte of the decoded COF instruction. If the instruction decode unit 104 determines that the characterization is incorrect, the instruction buffer 106 (FIG. 1) is flushed at step 508 and the COF cache 118 is updated at step 510 to reflect the prefetch unit's mischaracterization of the COF instruction. Updating the COF cache at 118 at step 510 may include, for example, deleting or invalidating the COF cache tag associated with the COF instruction, or clearing any indicators within the COF cache tag that the end byte of a COF instruction is located within the corresponding data segment.

In the event that the instruction decode unit 108 determines that the prefetch unit's characterization of the instruction as a COF instruction is correct the resulting decoded COF instruction is provided to the address calculation unit 112 and the execution unit 116. At step 512 the decoded COF instruction is executed by the execution unit 116, which resolves whether the prefetch unit's characterization of the COF instruction as predicted taken or not taken was correct at step 514. If incorrectly predicted as taken or not taken, the execution unit 116 signals that the pipe should be flushed at step 515 and signals that the prefetch unit 104 updates the COF cache 118 at step 516 to reflect its misprediction of the COF instruction. The update of the COF cache 118 performed at step 516 may include, for example reducing or adjusting the prediction strength associated with the COF instruction, deleting or validating the COF cache tag associated with the COF instruction, or the target address array entry associated with the COF instruction may be updated with the correct target address of the COF instruction as provided by the execution unit 116. In the event that the prefetch unit 104 correctly predicted the COF instruction, the COF cache 118 is updated at step 518 to reflect this correct prediction. The COF cache 118 may be updated at step 518 by, for example, increasing the prediction strength associated with the COF instruction.

Figure 6:
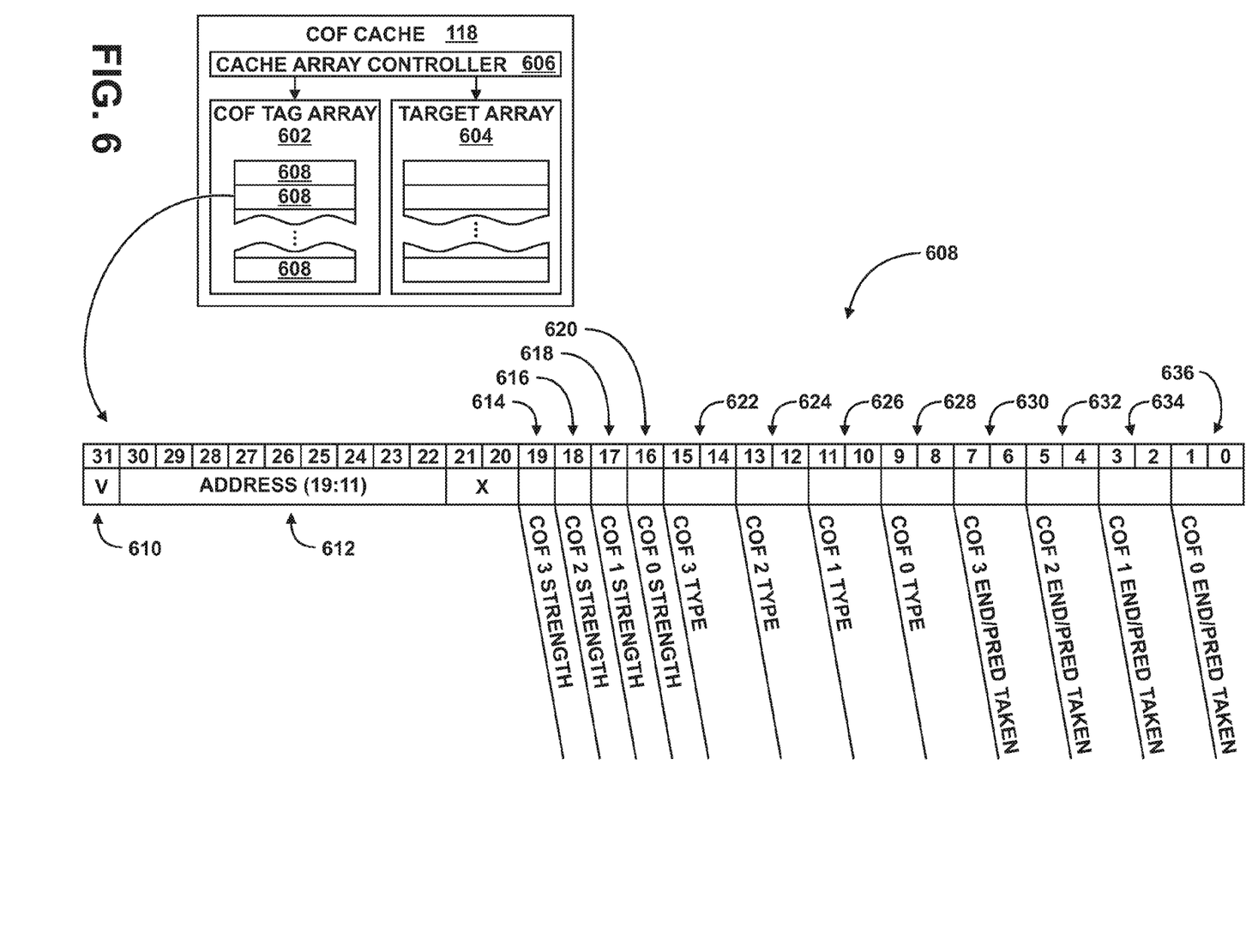
FIG. 6 is a block diagram illustrating an exemplary COF table in accordance with at least one embodiment of the present disclosure.

Referring now to FIG. 6 an exemplary implementation of the COF cache 118 is illustrated in accordance with at least one embodiment of the present disclosure. In the illustrated example, the COF cache 118 includes a COF tag array 602, a target array 604 and a cache array controller 606. The COF tag array 602 includes a plurality of COF tag entries 608 corresponding to a plurality of COF instructions. In an exemplary embodiment, the instruction cache 102 is a set associative cache having, for example, four ways. Accordingly, the COF tag array 602 and the target array 604 may be set associative arrays having, for example, four ways corresponding to the four ways of the instruction cache 102. Each entry of the target array 604 corresponds to an entry of the COF tag array 602.

FIG. 6 further illustrates an exemplary implementation of the COF tag entries 608 in instances where the prefetch unit 104 is configured to obtain quad-word-sized data segments from the instruction cache 102. As the data segments are quad-words, there are eight bytes for each the data segment, each of which potentially may contain the end byte of a predicted taken COF instruction. Further, for the example illustrated by FIG. 6, it is assumed that the minimum COF instruction tracked by the COF tag entries 608 is two bytes. Accordingly, each quad-word data segment may contain at up to four COF instructions.

In the illustrated implementation, the COF tag entry 608 includes a plurality of fields related to the corresponding COF instruction. These fields may include a valid bit field 610 to indicate whether the COF tag entry 608 is valid. The COF tag entry 608 further may include an address field 612 that includes at least a portion of the address associated with a data segment in the instruction cache 102. In instances where the address field 612 represents only a portion of the address, it will be appreciated that aliasing issues may arise.

As there are a maximum of four COF instructions that may be represented by the quad-word data segment associated with the COF tag entry 608, the COF tag entry 608 may include a plurality of entries for each of the possible COF instruction positions of the quad-word data segment (designated as COF0 for bytes 0 and 1, COF1 for bytes 2 and 3, COF 2 for bytes 4 and 5, and COF 3 for bytes 6 and 7). The fields of the COF tag entry 608 associated with the potential COF positions may include, for example: strength field 614, type field 622 and end/predicted taken field 630 for the COF3 position; strength field 616, type field 624, and end/predicted taken field 632 for the COF2 position; strength field 618, type field 626 and end/predicted taken field 634 for the COF1 position; and strength field 620, type field 628 and end/predicted taken field 636 for the COF0 position.

The end/predicted taken fields 630-636 are used to indicate whether an end byte of a COF instruction is present in the corresponding two-byte COF position of the quad-word data segment, and if present, which of the two-bytes represents the end byte of the COF instruction. Table 1 illustrates the information represented by various combinations of a two-bit end/predicted taken field.

TABLE 1

COF End/Predicted Taken Field

| Bit 1 | Bit 0 | Indication |
|---|---|---|
| 0 | 0 | No End Byte of Predicted Taken COF Instruction Present |
| 0 | 1 | End Byte of Predicted Taken COF Instruction at First Byte |
| 1 | 0 | End Byte of Predicted Taken COF instruction at Second Byte |
| 1 | 1 | Alternate Mode |

As Table 1 illustrates, if neither bit of the two-bit end/predicted taken field is asserted, the corresponding COF position does not contain the end byte of a predicted taken COF instruction. If one bit of the two-bit end/predicted taken field is asserted, the corresponding COF position contains an end byte of a predicted taken COF instruction at the byte of the corresponding COF position represented by the asserted bit. Both bits of the two-bit end/predicted taken field being asserted, in one embodiment, acts as a signal for the prefetch unit 104 (FIG. 1) to enter an alternate mode for processing predicted taken COF instructions. In at least one embodiment, the alternate mode signaled by the assertion of both bits of the two-bit end/predicted taken field results in the corresponding type field being analyzed to determine what action to take, as discussed in greater detail below.

The strength fields 616-620 are used to indicate whether a COF instruction having an end byte in the corresponding COF position, if any, is predicted strongly or weakly taken (e.g., a value of 0 indicating weakly taken and a value of 1 indicating strongly taken). The type fields 622-628, in one mode, indicate the type of predicted taken COF instruction, if any, having an end byte in the corresponding COF position. Table 2 illustrates the information represented by various combinations of a two-bit type field.

TABLE 2

| COF Type Field in Default Mode | | |
| --- | --- | --- |
| Bit 1 | Bit 0 | Indication |
| 0 | 0 | Not a Predicted Taken COF Instruction |
| 0 | 1 | CALL Instruction |
| 1 | 0 | RETURN Instruction |
| 1 | 1 | Other Type of COF Instruction |

As noted above, the assertion of both bits of the two-bit end/predicted taken field may serve to signal that the prefetch unit 104 is to switch from a default process to an alternate process. For example, in one embodiment, the alternate mode signal provided by the assertion of both bits of the end/predicted taken field may serve to direct the prefetch unit 104 to utilize an alternate algorithm to determine the target address of the predicted taken COF instruction having its end byte at the corresponding COF position. However, it will be appreciated that because both bits of the end/predicted taken field are asserted, the end/predicted taken field provides no indication of which byte of the COF position is the end byte of the predicted taken COF instruction. Accordingly, in one embodiment, the corresponding type field provides a secondary use for indicating which byte of the COF position is the end byte of the predicted taken COF instruction using the convention illustrated by Table 1. In this manner, the type field acts as a substitute end/predicted taken field when the end/predicted taken field is used to signal that an alternate mode is to be used when the prefetch module 104 processes the corresponding predicted taken COF instruction. In an alternate embodiment, the corresponding strength field provides a secondary use for indicating which byte is the end byte of the COF. For example, a "0" value may identify the first byte a "1" value may identify the second byte.

Figure 7:
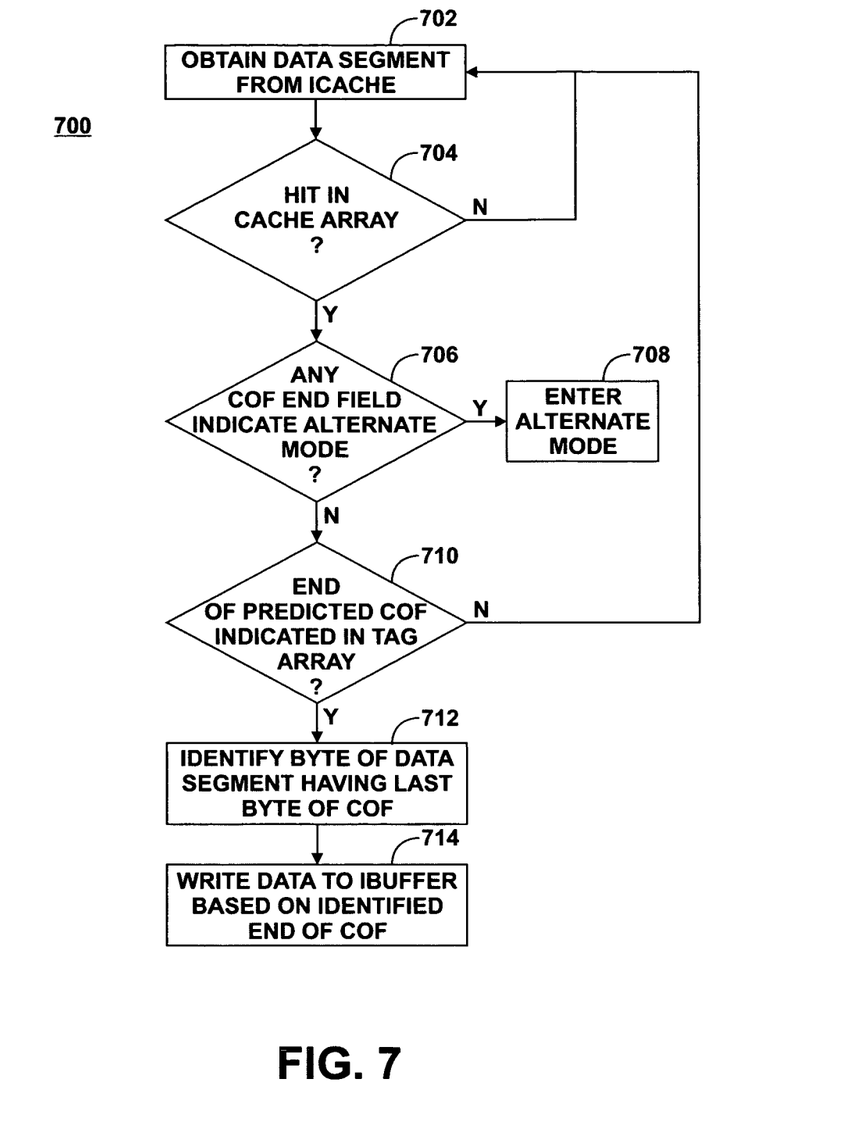
FIG. 7 is a flow diagram illustrating an exemplary method for aligning COF instructions in an instruction buffer utilizing the exemplary COF table of FIG. 6 in accordance with at least one embodiment of the present disclosure.

Referring now to FIG. 7 an exemplary method 700 for utilizing the COF cache 118 depicted in FIG. 6 is illustrated in accordance with at least one embodiment of the present disclosure. The method 700 initiates at 702 where in a quad-word data segment is received from the instruction cache 102. A portion of the address associated with the data segment had previously been provided to the cache array controller 606, wherein the address portion was compared with the address portions in the field 612 of the COF tag entries 608 of the COF tag array 602 to determine whether there was a hit at block 704. If no corresponding tag had been identified in the COF tag entry array 602, the applicable portion of the data segment after the requested address is loaded into the instruction buffer 106 and provided for subsequent decoding and execution by the remainder of the pipeline. In the event that the applicable portion of the data segment contained a taken COF instruction at or after the address of the requested instruction, this information is provided to the prefetch unit 104 and the cache array controller 606, which then may create a new entry in the COF tag array 602 corresponding to the taken COF instruction. As a result of the creation of this new entry, the next time the same data segment is loaded, the hit will occur from the COF tag array 602 and the prefetch unit 104 may identify the end of the predicted taken COF instruction in the data segment.

In the event there is a hit at block 704, the prefetch unit 104 determines from the corresponding COF cache tag entry 608 whether an alternate mode is to be entered at block 706. As noted above, in one embodiment, the entry to an alternate mode may be signaled by, for example, setting both bits of the corresponding two-bit end/predicted taken field. If an alternate mode is indicated, the alternate mode is entered at step 708. The alternate mode may include, for example, using a different algorithm than the default algorithm to determine the target address of a predicted taken COF instruction.

If no alternate mode is to be entered, the method 700 proceeds to step 710 wherein the prefetch unit 104 determines whether the end byte of a predicted taken COF instruction is present in the applicable portion of the data segment. As noted above, due to the decoupling between the instruction buffer 102 and the COF cache 118, step 710 may occur prior to or during the fetch of the data segment from the COF cache 118. If the prefetch unit 104 determines that the applicable portion of the data segment contains the end byte of a predicted taken COF instruction, at step 712 the prefetch unit 104 identifies the byte of the data segment that represents the end byte of the predicted taken COF instruction. In instances wherein the end bytes of multiple predicted taken COF instructions are present in the applicable portion of the data segment at or after the requested instruction address, the identified byte is the byte representing the end byte of the subsequent predicted taken COF instruction in the data segment that is closest to the requested instruction address. As described above with reference to Table 1, above the prefetch unit 104 may analyze the end/predicted taken fields of the COF cache tag entry 608 to identify the location of the end byte of a predicted taken COF instruction (if any) in the data segment. At step 714 a portion of the applicable portion of the data segment up to and including the identified byte representing the last byte of the COF instruction is written to the instruction buffer 108. If the end byte of a predicted taken COF instruction is not present in the data segment, the prefetch unit 104 writes the entire data segment to the instruction buffer 106 (FIG. 1) and returns to step 702.

Other embodiments, uses, and advantages of the disclosure will be apparent to those skilled in the art from consideration of the specification and practice of the disclosure disclosed herein. The specification and drawings should be considered exemplary only, and the scope of the disclosure is accordingly intended to be limited only by the following claims and equivalents thereof.

What is claimed is:
1. A method comprising:
    storing a first value at a first field of a first cache tag line when a next occurrence of a first change-of-flow (COF) instruction is presumed to branch and when the end location of the first COF instruction is at a first location of memory;
    storing a second value at the first field to indicate the next occurrence of the first COF instruction is presumed to branch and when the end location of the first COF instruction is at a second location of memory;

storing the first COF instruction at a first storage location of an instruction buffer;
determining a second storage location of the instruction buffer that is immediately adjacent to the first storage location based on the first field of the first cache tag line; and
storing a target instruction at a branch target address of the first COF instruction at the second storage location.

2. The method of claim 1, further comprising:
storing a third value at the first field to indicate the next occurrence of the first COF instruction is presumed to not branch.

3. The method of claim 2, wherein the end location of the first COF is not determinable based upon the information within the first cache tag line when the third value is stored at the first field.

4. The method of claim 2, further comprising:
storing a fourth value at the first field to indicate a first target address operation is to be used that is different than a second target address operation used when one of the first, second, or third values is stored at the first field.

5. The method of claim 4, wherein the first target address operation determines a branch target address differently than the second target address operation.

6. The method of claim 5, wherein the second target address operation determines the branch target address by accessing a memory array containing branch target addresses.

7. The method of claim 1, further comprising:
storing the first value at a second field of the first cache tag line when a next occurrence of a second COF instruction is presumed to branch and when the end location of the second COF instruction is at a third location of memory; and
storing the second value at the second field when the next occurrence of the second COF instruction is presumed to branch and when the end location of the second COF is at a fourth location of memory.

8. The method of claim 7, wherein the first and second COF instructions have different lengths.

9. The method of claim 1, further comprising:
storing a third value at the first field to indicate a COF type of the first COF instruction when a second field of the first cache tag line has a first value; and
wherein the second field has a second value when storing the first value and when storing the second value.

10. The method of claim 1, further comprising:
sequentially accessing the first COF instruction and the target instruction from the instruction buffer for execution by a processor.

11. A method comprising:
determining that a first value of a set of values resides at a first field of a plurality of fields of a cache tag line, wherein each member of the set of values identifies a location in memory where a predicted taken change-of-flow (COF) instruction ends;
storing a first COF instruction associated with the first field in an instruction buffer; and
storing a first instruction predicted to be executed immediately following the first COF instruction at a first location of the instruction buffer, wherein the first location is based upon a location of the first field within the cache tag line.

12. The method of claim 11, further comprising:
determining whether the cache tag line is present in a cache tag array, wherein determining the first value resides at the first field occurs when it is determined the cache tag line is present, and wherein the cache tag line is associated with a set of instruction data.

13. The method of claim 12, further comprising:
providing an address of the first instruction to an instruction prefetch unit in response to determining the first value resides at the first field.

14. The method of claim 11, further comprising:
determining that a second value of a set of values resides at a second field of the plurality of fields;
storing a second COF instruction associated with the second field in an instruction buffer; and
storing a second instruction predicted to be executed immediately following the COF instruction at a second location of the instruction buffer, wherein the second location is based upon a location of the second field within the cache tag line.

15. A processor comprising:
an instruction cache comprising instruction data represented by a plurality of data segments;
an instruction buffer; and
a prefetch unit comprising an input operably coupled to the instruction cache and an output operably coupled to an input of the instruction buffer, the prefetch unit operable to:
receive a first data segment from the instruction cache;
determine whether an end byte of a predicted taken change-of-flow (COF) instruction is present in the first data segment;
store the first data segment in a next available location of the instruction buffer when it is determined that an end byte of the predicted taken COF instruction is not present in the data segment;
store a portion of the first data segment in the next available location of the instruction buffer when it is determined that an end byte of the predicted taken COF is present in the data segment, the portion of the first data segment excluding data of the data segment that is subsequent to the end byte of the predicted taken COF instruction present in the data segment;
a cache tag array comprising a plurality of tag entries associated with the plurality of data segments of the instruction cache, the plurality of tag entries comprising:
a first field to indicate whether an end byte of a predicted taken COF instruction is present in the data segment and the byte position of the end byte if present; and
a second field to indicate a type of COF instruction if the end byte is present; and
wherein the prefetch unit is operable to determine whether an end byte of a predicted taken COF instruction is present in the first data segment based on information provided by the first and second fields of a first tag entry of the cache tag array that is associated with the first data segment, and to store a first instruction predicted to be executed immediately following the predicted taken COF instruction at a first location of the instruction buffer, wherein the first location is based upon a location of the first field within the cache tag line.

16. The processor of claim 15, wherein:
the prefetch unit is further operable to:
employ a predetermined target address calculation mode when a predetermined value is present in the first field of the first tag entry associated with the first data segment; and
determine which byte of the first data segment comprises the end byte of a predicted taken COF instruction based on a value present in the second field.

17. The method of claim 11, wherein the first location is immediately adjacent to a current location of the instruction buffer.

18. The method of claim 11, further comprising:
storing a second value at the first field to indicate the next occurrence of the first COF instruction is presumed to not branch.

19. The method of claim 18, further comprising:
storing a third value at the first field to indicate a first target address operation is to be used that is different than a second target address operation used when one of the first or second values is stored at the first field.

20. The method of claim 19, wherein the first target address operation determines a branch target address differently than the second target address operation.

* * * * *